Oct. 1, 1935.  H. R. GEER  2,016,141
ROLLING MILL GUIDE
Filed April 1, 1931  6 Sheets-Sheet 1
*Fig. 1.*
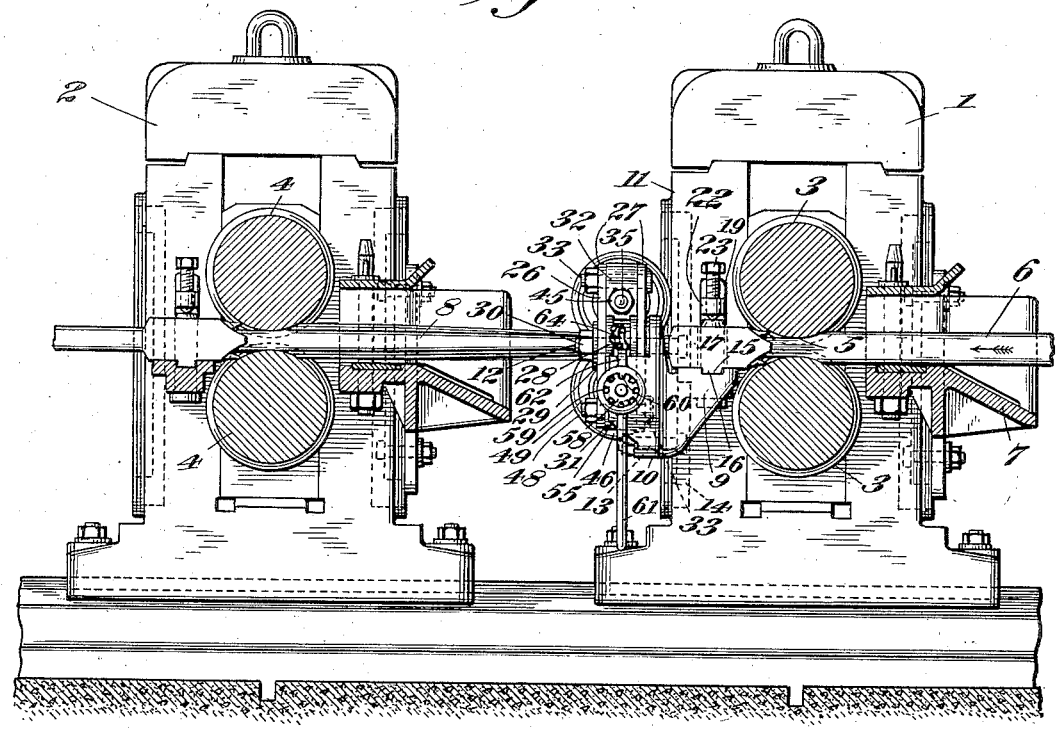
*Fig. 2.*
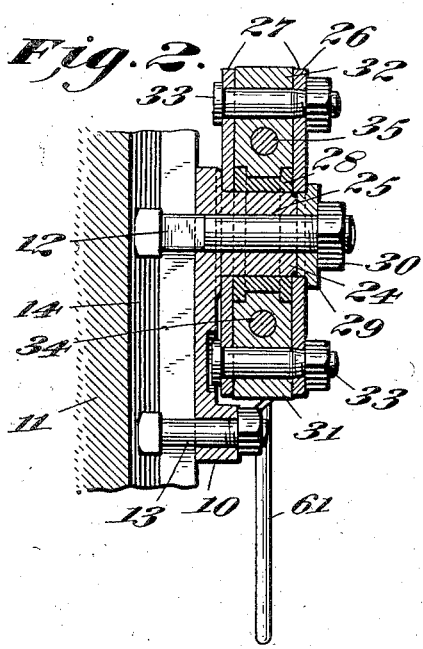
*Fig. 3.*
*Fig. 4.*
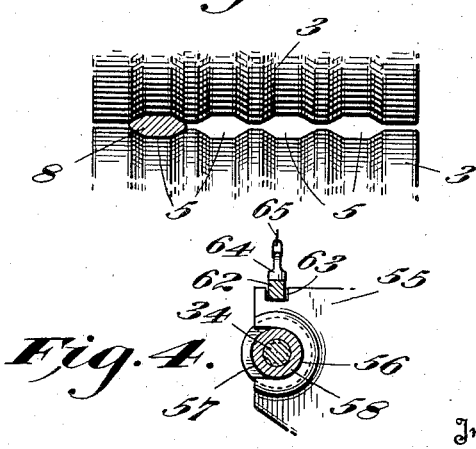
Inventor
*Harry R. Geer.*
By *R. S. A. Dougherty*
Attorney Oct. 1, 1935. H. R. GEER 2,016,141
ROLLING MILL GUIDE
Filed April 1, 1931 6 Sheets-Sheet 2

Inventor
Harry R. Geer.
By R. S. A. Dougherty
Attorney

Oct. 1, 1935.   H. R. GEER   2,016,141
ROLLING MILL GUIDE
Filed April 1, 1931   6 Sheets-Sheet 5

Inventor
Harry R. Geer.
By R. S. A. Dougherty.
Attorney

Inventor
Harry R. Geer.

Patented Oct. 1, 1935

2,016,141

UNITED STATES PATENT OFFICE 2,016,141

ROLLING MILL GUIDE

Harry R. Geer, Westmont, Pa., assignor to Bethlehem Steel Company, a corporation of Pennsylvania Application April 1, 1931, Serial No. 526,845

20 Claims. (Cl. 80—53)

My invention relates to rolling mill apparatus and more especially to the guide equipment therefor and is applicable to metal rolling mills having stands of rolls known as two-high and three-high mills, and is particularly adapted for use in connection with two-high mills of the continuous type for guiding bars or other sections of metal to and from the reducing and forming rolls.

Although my invention is adapted for use in connection with mills of different types, I will for simplicity of description refer to the rolled piece of metal which is to be guided by my apparatus to the passes of the several stands of rolls, as a bar, but I wish it understood that my apparatus is equally adapted to handle blooms, billets, slabs, beams, channels, angles, T's, rails, flats, ovals, half-ovals, and in fact, any metal or material which is formed or operated upon by rolls, two different forms of said sections of which are illustrated in the drawings accompanying this specification.

In continuous mills having a succession of roll stands each having sets of rolls with passes formed therein for reducing bars in more than one direction, require twisting means whereby the axis of the bar being rolled is rotated usually about 90° between the succession of passes.

In former times stationary guides having in their length a winding or twisted passage were commonly employed for this purpose, but owing to the tendency of these guides to scratch the hot bars in passage, and also because of the rapidity with which these twisted passages lose their shape and have to be frequently replaced or repaired, during which time the entire mill must be shut down, a more desirable form of twisting means was required.

In recent times roller twisters have been designed to be used with one of the several roll passes in a set of rolls, but owing to the restricted space into which guides must fit necessitates small rollers and shafts wholly out of proportion to the loads to be carried, therefore the maintenance cost is excessive and the shifting to other passes time consuming and costly.

My apparatus is adapted for use in connection with what is known as tandem continuous mills in which the axes of the rolls are substantially parallel to each other, one pair in front of the next pair and at comparatively short distances apart, whereby the bar is simultaneously reduced in a number of pairs of rolls, or it may be used in connection with tandem mills in which the successive pairs of rolls are placed with their axes parallel to each other, one pair in front of the next pair at considerable distance apart, and it is also equally applicable for use in connection with what is known as a train of rolls, that is, a number of pairs of reducing rolls arranged with their axes approximately in line with each other.

My apparatus may be employed in connection with repeaters or roll trains in cases where it is desired to facilitate the passage of the bar around or through the repeaters, by twisting the bar so that the major axis of its cross-section becomes vertical and therefore offers the least resistance to bending in an approximately horizontal plane, whereby it is easily looped from one pass to the next.

In some cases it is preferable that the bar should be in two or more reducing passes of the rolls at the same time, thereby accomplishing the work of reducing while the bar is hot and minimizing the travel of the same during the rolling process, and this is accomplished by having the roller twisting guides and repeaters, if repeaters are used, near the reducing rolls.

I consider it essential that my roller twisting guide construction should be readily demountable to facilitate the removal of a bar therefrom which may have been improperly reduced or distorted in the rolls, such a bar being known as a "cobble".

My design of roller twisting guides embraces a pair of parallel rollers about the same length as the mill rolls, on which are mounted pairs of opposed collars for each line of roll-passes. These parallel rollers are mounted on shafts carried on vertical walking beams and provided with adjusting means for shifting the rolls lengthwise, oppositely, with reference to each other. The collars are removably mounted on the rollers and may be of several forms to accommodate pass shapes, as rectangles, diamond, ovals, etc. and the adjustment makes it possible to impart any desired twist angularity. It is possible with my device to so equip a stand of rolls that any section from it may be twisted or rotated and to suitably align the forward end of the bar to enter the pass in the next set of rolls.

One of the objects of my invention relates to mounting the twisting guides in such a manner that each pair of coacting collars forming the sides of the guides for the bar can be simultaneously adjusted longitudinally without changing the centers between the collars thereby increasing or diminishing the angle of twist of the bar being rolled in order to make the forward end of the bar register correctly with the next roll pass.

Another object of my invention relates to mounting the roller twisting guides in such a manner as to impart a greater twist angularity to the bar than required and interposed stationary twist guides having less twisting angle capacity than the minimum required having means for simultaneously adjusting the twisting rolls longitudinally in both directions, and means for adjusting the twisting rollers independent of each other.

Another object of my invention relates to forming the roller twisting guides with a plurality of removable collars mounted thereon, each collar mounted on one twisting roller cooperating with a collar mounted on the other twisting roller to form a guide for the bar being rolled, thereby forming a unit construction for a plurality of roll passes.

Another object of my invention relates to the manner of mounting the roller twisting guide unit to the rest bar so it can be quickly attached or detached from the roll housings when desired.

Another object of my invention relates to the means for adjusting the roller twisting guides whereby the angle of rotation of the bar being twisted may be varied while it is in transit.

Another object of my invention relates to the interchangeable collars and fastening means whereby the twisting mechanism may be adapted to roll passes of varying sizes and shapes.

Another object of my invention relates to a twisting mechanism of unitary structure mounted opposite the roll passes having primary stationary twisting guides and secondary roller twisting guides in which the primary set of guides ceases to function as twisters after the bar end enters the secondary set of twisters.

Having thus given a general description of my invention, I will now, in order to make the same more clear, refer to the annexed six sheets of drawings forming a part of this specification and in which like characters indicate like parts.

Figure 1 is a vertical transverse section taken centrally through two stands of rolls of a two-high continuous wire and rod rolling mill illustrating one form of my improved roller twisting guides in end elevation attached to one of the roll housings;

Fig. 2 is a transverse section taken on the line 2—2 of Fig. 6;

Fig. 3 is a detail view illustrating the shape and number of the roll passes in the pair of rolls 3;

Fig. 4 is a detail section taken on the line 4—4 of Fig. 6;

Figure 5:
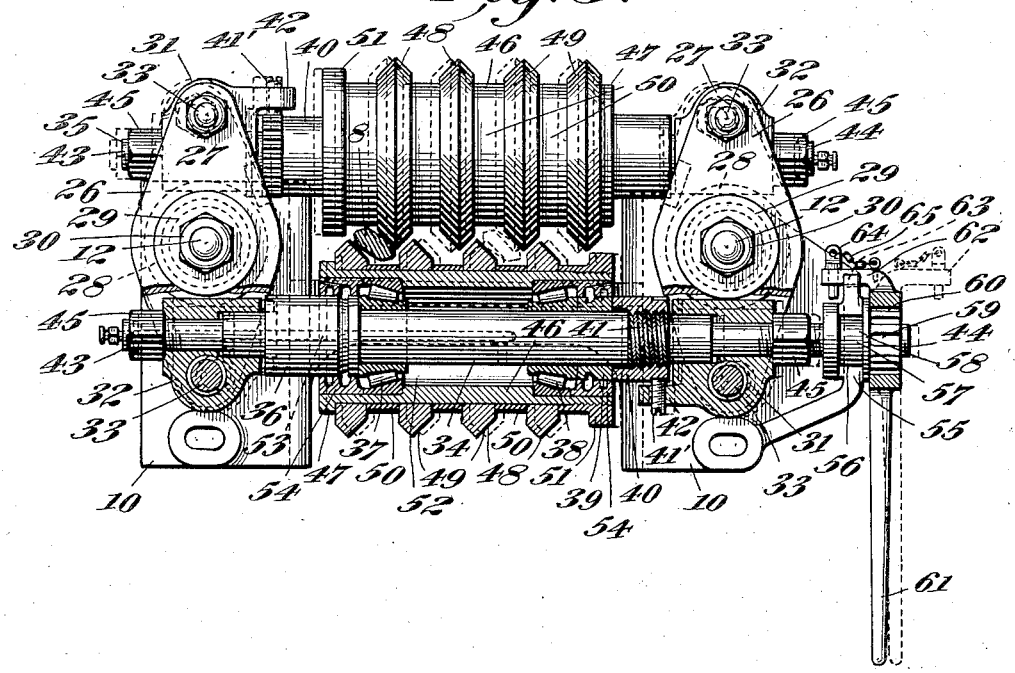
Fig. 5 is a front elevation of my roller twisting guides as illustrated in Fig. 1 with parts broken away to more clearly illustrate the manner of mounting the rollers.

Referring now in detail to the various characters of reference on the drawings and first to Figs. 1 to 8 inclusive, the numerals 1 and 2 indicate the roll housing of two stands of a continuous rolling mill type of a wire and rod mill, in this mill the plurality of roll stands are placed close together but this detail will be varied in continuous mills of different types. 3 and 4 designate the pairs of rolls for the two stands respectively, each preferably having a plurality of passes formed therein as indicated at 5 in Fig. 3, for the pair of rolls 3. In this figure a bar 6 rectangular in cross-section is fed into the entering guides 7, and through one of the passes 5 and reduced as indicated to a substantially diamond shaped bar 8 in cross-section, having its major axes horizontally disposed as it leaves the pass 5, although it will be readily understood that the roll passes may be formed to produce other shapes as ovals, flats, etc.

A rest bar 9 having brackets 10 at each end formed integral therewith is attached to the roll housings 11 of the roll stand 1 opposite the passes 5 by means of bolts 12 and 13 the heads of which engage the T-slots 14 in the roll housing. As indicated in Fig. 8 the holes in the brackets 10 for the passage of the bolts 12 and 13 are elongated to allow for a slight adjustment of the rest bar 9 if required.

Figure 6:
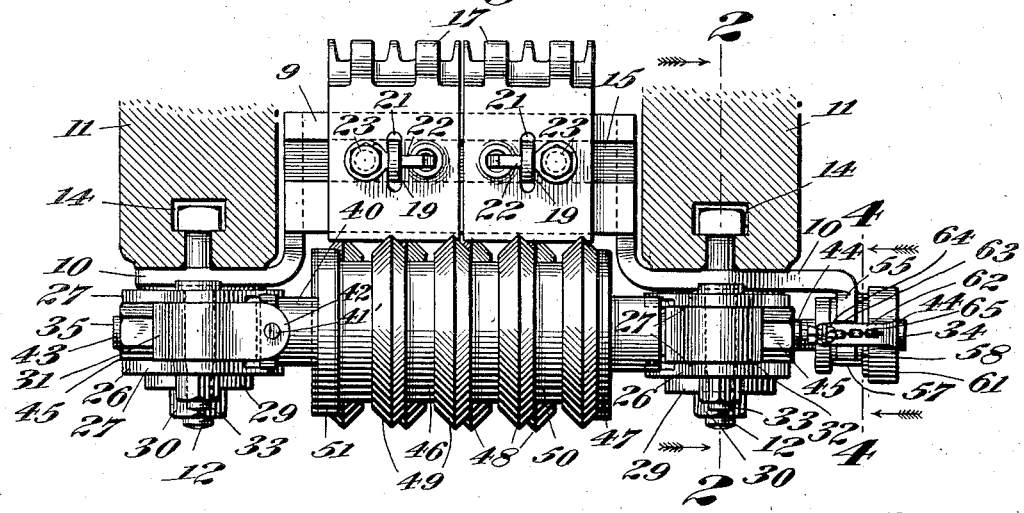
Fig. 6 is a top plan view of the roller and stationary twisting guides of the construction illustrated in Fig. 5.
Figure 7:
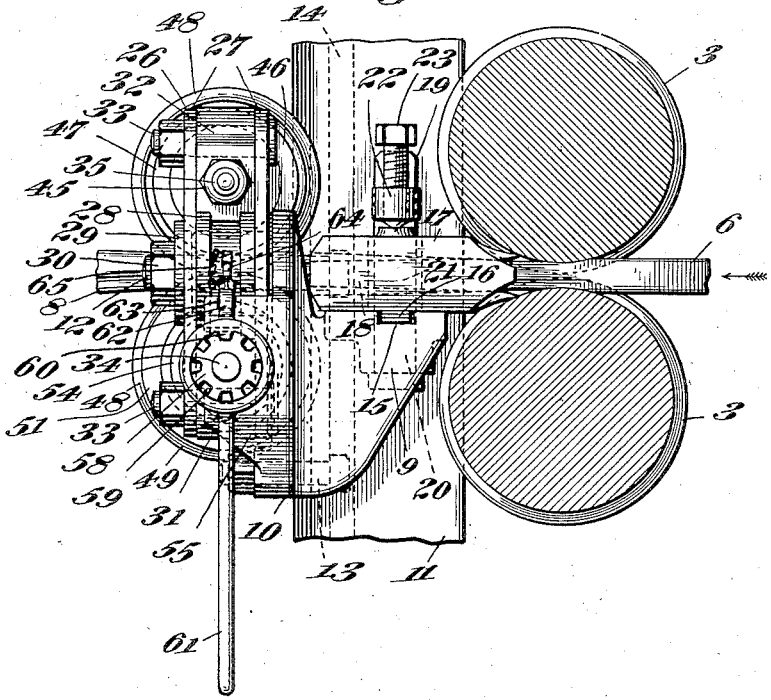
Fig. 7 is an end elevation of the construction shown in Figures 5 and 6 the mechanism being attached to the roll housing with the rolls in section.
Figure 8:
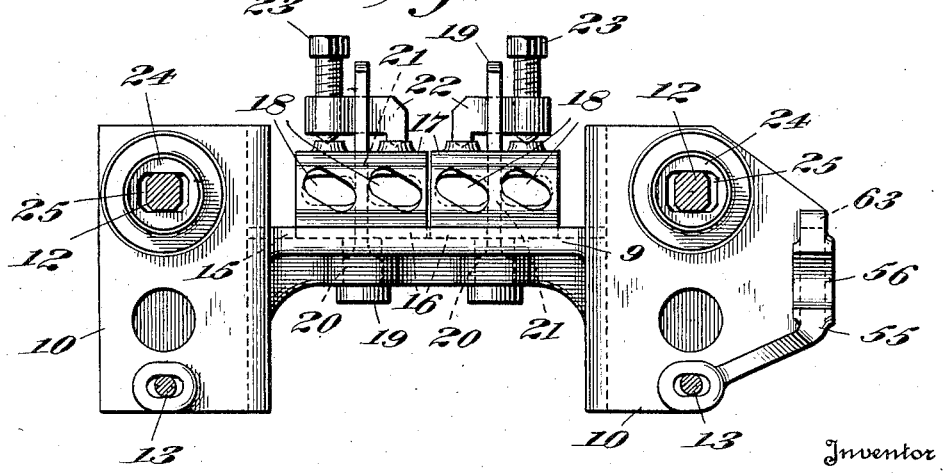
Fig. 8 is a front elevation of the stationary twisting guides and rest bar.

The top of the rest bar 9 is grooved as at 15 to receive the projections 16 formed on the stationary guides 17, as clearly indicated in Figs. 6, 7 and 8. As shown in these figures, each guide has two twisting passageways 18 formed therein, one of each of which is adapted to be in alignment with one of the roll passes 5 and receive the bars from the roll pass, although I wish it understood that these guides may be made with one or a plurality of twisting pasageways if so desired. The guides are secured to the rest bar 9 by means of bolts 19 which pass through openings 20 and 21 in the rest bar and guides respectively. The bolts 19 being secured at their upper ends by means of adjustable clamping clips 22 and set bolts 23. Extending outwardly from each of the brackets 10 is a boss 24 perforated as at 25 for the passage of the bolts 12 by means of which the roller twisting unit is secured thereto. A walking beam 26 comprising a pair of spaced links 27 connected together centrally by means of a thimble 28 is pivotally mounted on each of the bosses 24 and a flanged washer 29 engages the end of each of the bosses and extend over the side face of the walking beam and held in position by means of a nut 30 screwed on the end of the bolt 12.

Between the outer ends of the links 27 of the walking beams 26 are pivoted bearing blocks 31 and 32 by means of bolts 33 for supporting the ends of the shafts of the roller twisting guides, the rollers for which are similarly constructed and mounted. These shafts 34 and 35 have their ends supported in the bearing blocks 31 and 32, each having at an intermediate point an annular shoulder 36 formed integral with the shafts or rigidly secured thereto, forming an abutment for an anti-friction bearing 37. Another anti-friction bearing 38 is mounted on each shaft 34 and 35 in spaced relation to the anti-friction bearing 37 and held in position by means of an annular ring 39 and adjustable nut 40 screwed on the threaded portion 41 of the shafts. In order to hold the nuts 40 in their adjusted position the outer surface of the nuts are milled for a portion of their lengths to engage a set screw 41' which is threaded into an overhanging projecting lug 42 formed integral with, and extending from the inner edge of each of the bearing blocks 31.

The outer ends of the shafts 34 and 35 are screw threaded as at 43 and 44 to receive nuts 45 which are adapted to be screwed tight against the outer surface of the bearing blocks 31 and 32 for holding the shafts in a fixed position. These nuts also serve the purpose for longitudinal adjustment of the shafts. A roller 46 is mounted on the anti-friction bearings 37 and 38 of each of the shafts 34 and 35 having an annular flange 47 at one end and a plurality of coacting removable collars 48 having inclined side faces 49 adapted to form guides between the same. These collars are spaced apart by means of annular rings 50 and a nut 51 is screwed on the opposite end of the roller to that of the flange 47 for clamping the parts in the desired position. An annular space 52 is formed between the anti-friction bearings 37 and 38 which is supplied with oil through a duct 53 in the shafts and packing glands 54 at the ends of the rollers 46 prevents the oil from escaping from the rollers.

One of the brackets 10 of the rest bar 9 has a flanged end 55 bifurcated as at 56 and adapted to form a bearing to receive the annular grooved portion 57 of a nut 58 having an outer toothed or fluted portion 59 for engaging the tooth 60 of the wrench 61. This wrench 61 has a flanged projection 62 adapted when the wrench is not in use to extend through a notch 63 in the upper surface of the flanged end 55 of the bracket 10, and has a locking pin 64 extending through a hole near the end of the projection 62 for retaining the wrench in position. The pin 64 secured to the wrench to prevent loss by means of a chain 65. When it is desired to use the wrench the pin 64 is removed from the hole in the projection 62, the wrench can then be removed from the fluted end portion 57 of the nut 56 and reversed as indicated in dotted lines in Fig. 5, the nut can then be rotated in either direction to simultaneously adjust both of the rollers 45 longitudinally in either direction, thereby varying the space between the collars 48 on the one roll and those on the other to increase or decrease the angular twist of the bar as it passes through the guide formed between the collars.

The inclined face of each collar on one of the rollers 45 coact with an opposed inclined face of another collar on the other roller to form a guide between the same which is in alignment with one of the passageways 18 formed in the stationary guides 17 and receives the bar after its passage through the roll pass. It will be noted that as the rollers are adjusted longitudinally by means of the wrench 59 and rotating nut 56 that the centers between the coacting collars 48 will always remain in a fixed position as indicated in Figs. 5 and 9 of the drawings, in such a manner that when the guide-ways between the coacting collars on the rollers are properly adjusted in alignment with a plurality of roll passes one or more of the roll passes may be used without adjusting the roller twisting guides, or in case any adjustment is necessary it can be quickly done by means of the wrench.

If desired the collars may be adjusted during the passage of the bar through the guides to give a greater or less twist to the bar to properly align the forward end of the bar for the next roll pass.

In the operation of my twisting mechanism the rectangular bar 6 is fed forward and enters the pass 5 in the pair of rolls 3 which reduces its cross-section area to a substantially diamond shaped bar 8 in cross-section with its major axes horizontally disposed. The bar 8 then enters the twisting passageway 18 in the stationary guides 17 and is given an initial twist of the required angle of rotation. The bar then passes between the rollers 46 having a pair of collars 48 mounted thereon having opposed coacting inclined side faces 49 which form the sides of the twisting guide for the bar 8, the space between the collars 48 with their inclined surfaces being so adjusted as to give the final angular twist to the bar to properly align the forward end of the bar to enter the next roll pass. It will be noted that the passageway 18 in the stationary guide is of greater width than the thickness of the bar 8 and that the final twisting of the bar as it passes between the roller twisters 46 at this point lifts the bar from the sides of the passageways 18 in such a manner that the passageway ceases to function as a twisting guide and removes all rubbing action for the remainder of the bar's length.

Figure 9:
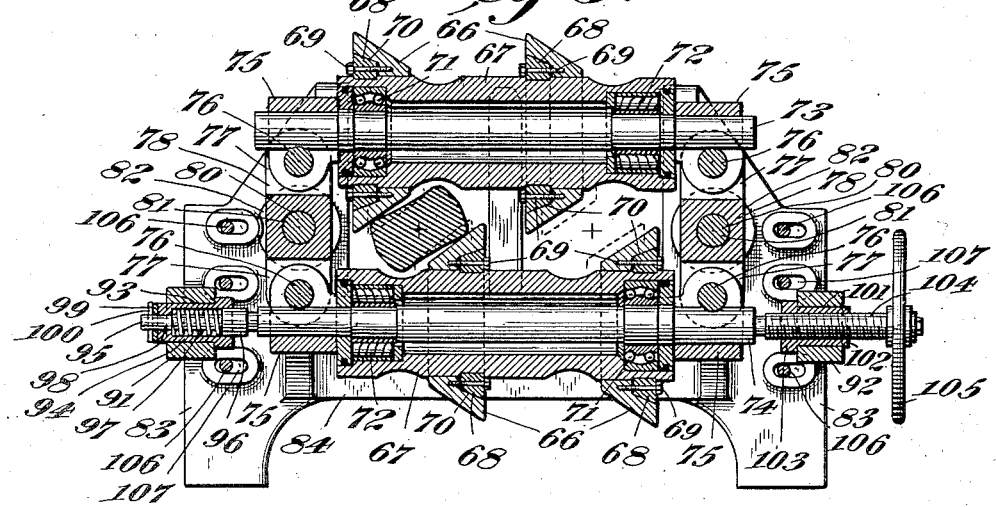
Fig. 9 is a vertical longitudinal section taken on the line 9—9 of Fig. 11 illustrating a modified form of roller twisting guide for twisting and guiding bars of larger section.
Figure 10:
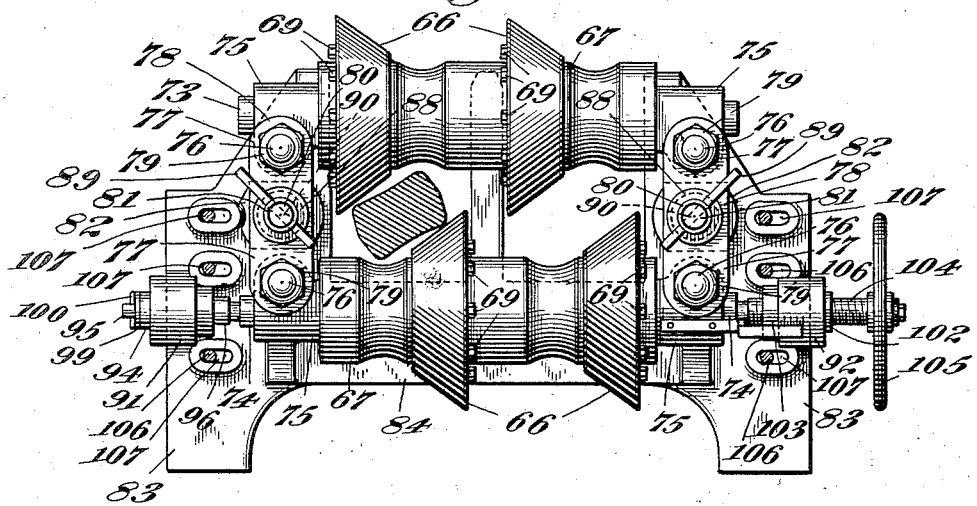
Fig. 10 is a front elevation of the roller twisting guide unit as illustrated in Fig. 9.
Figure 11:
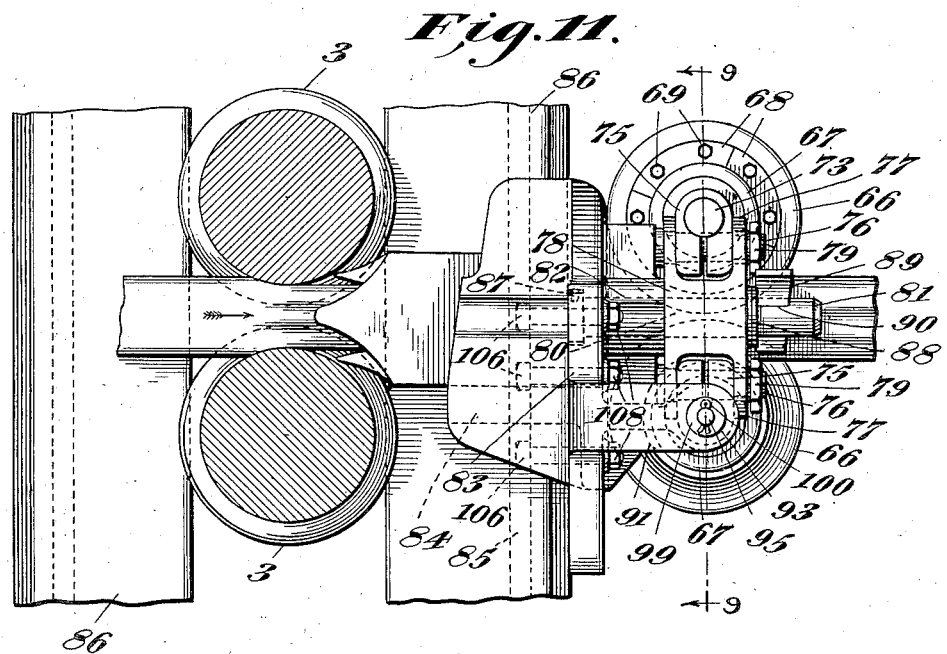
Fig. 11 is an end elevation of the construction as illustrated in Figs. 9 and 10 showing the roller twisting guide unit attached to a roll housing with the rolls in section.
Figure 12:
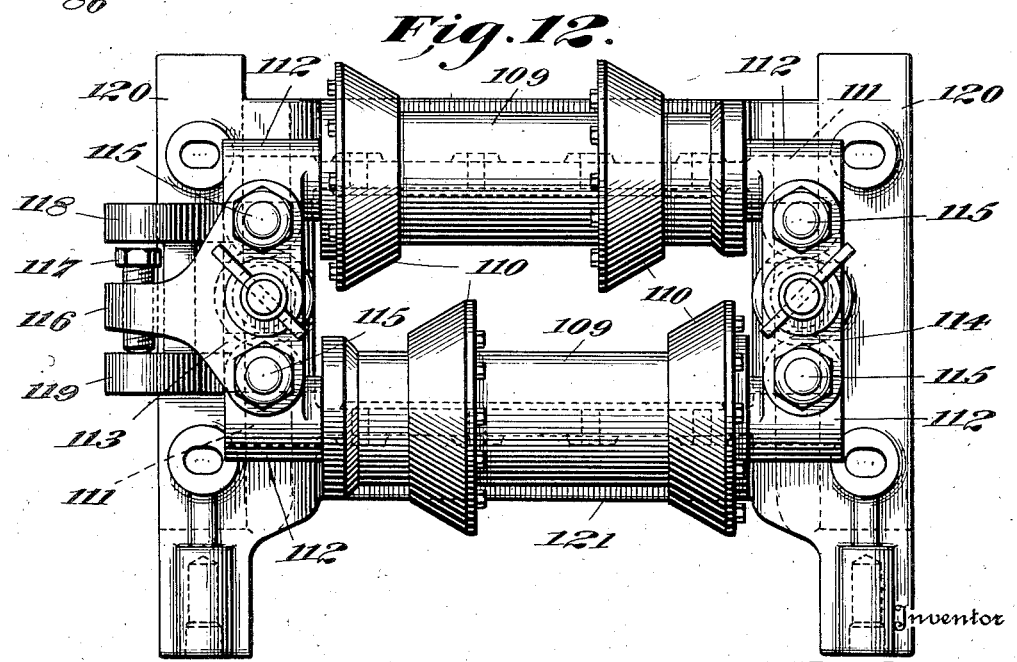
Fig. 12 is a front elevation illustrating another modified form of mounting the roller twisting guides.
Figure 13:
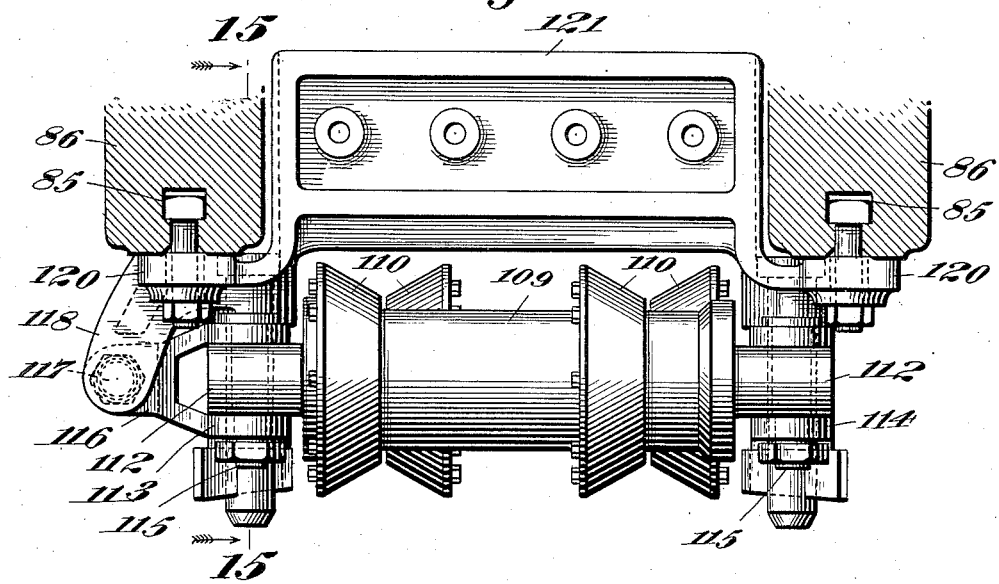
Fig. 13 is a top plan view of the form of roller twisting guides illustrated in Fig. 12.
Figure 14:
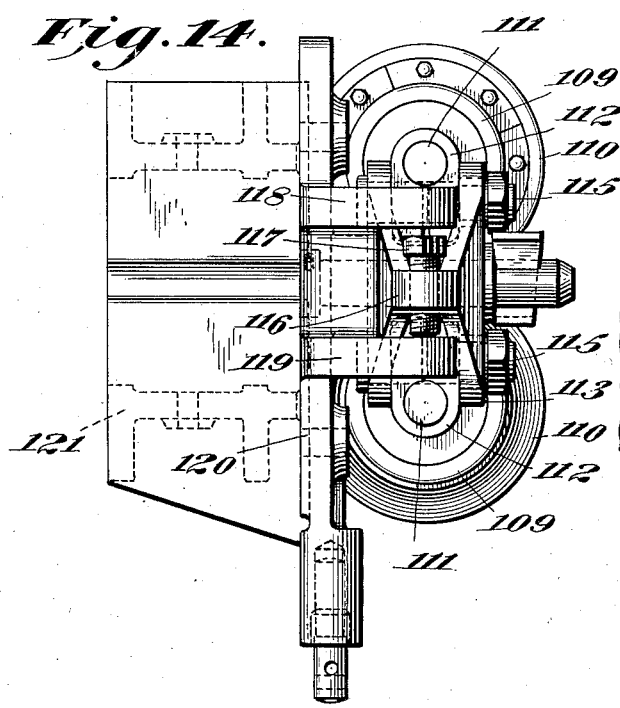
Fig. 14 is an end elevation of the construction shown in Figs. 12 and 13.
Figure 15:
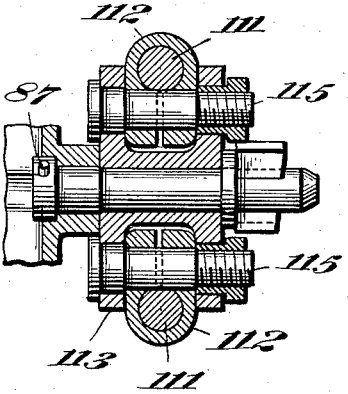
Fig. 15 is a detail section taken on the line 15—15 of Fig. 13.

In Figs. 9, 10 and 11 I have illustrated a modified form of a roller twisting guide for twisting or rotating bars of larger size than those shown in the construction illustrated in Figs. 1 to 8 in which two pairs of coacting collars 66 having inclined faces are shown mounted on rollers 67. The collars 66 are removably secured to the rollers 67 by means of segmental or split wedge blocks 68, which are seated in an annular groove formed at intermediate points on the periphery of the rollers 67 with the inclined surfaces of the wedge blocks engaging the inclined recesses 70 of the collars and secured in position by means of bolts 69. The rollers 67 have anti-friction bearings 71 and 72 which are mounted on shafts 73 and 74 in a similar manner to those above described in Figs. 1, 2, 5, 6 and 7. The ends of the shafts 73 and 74 are mounted in split bearing blocks 75 which are keyed thereto and pivoted by means of bolts 76 to the bifurcated ends 77 of the walking beams 78 and held in position by means of nuts 79. The walking beams 78 are each formed in one piece and are each pivoted centrally as at 80 by means of a bolt 81 to an extending boss 82 on the bracket ends 83 of the rest bar 84. The bolt 81 does not extend into the T-slot 85 in the roll housing 86, as in the construction illustrated in Figs. 1, 2, 6 and 7, but is keyed as at 87 to the bracket ends 83 the opposite ends of each of said bolts 81 having a washer 88 and key 89 extending through a slot 90 for holding the walking beam 78 in position.

In case it is desired to remove the roller twisting guides as a unit it is only necessary in this construction to remove the keys 89 and the entire rotary twisting mechanism can be removed from the bolts 81.

Bracket arms 91 and 92 extend outwardly from the bracket ends 83 of the rest bar 84 for receiving the adjusting mechanism for the roller twisting guides. The bracket arm 91 is perforated at the outer end, as at 93 to receive a thimble 94 having a plunger 95 with a head portion 96. A spring 97 is mounted on the plunger 95 interposed between the head portion 96 and the end of the thimble to normally project the inner end of the plunger against one end of the shaft 74. The outer end of the plunger 95 extends through one end of the thimble as at 98 and has a washer 99 mounted thereon and a cotter pin 100 extends therethrough for holding the plunger in the desired position. The bracket arm 92 has its outer end perforated as at 101 for receiving a nut 102 having a collar formed thereon as at 103 for engaging the side of the bracket arm 92. An adjusting screw 104 having a hand wheel 105 on its outer end is screwed into the nut 102 and adapted to have its inner end engage the opposite end of the shaft 74 to that of the plunger 95.

The spring pressed plunger 95 engages one end of the shaft 74 under tension and holds the opposite end of the shaft at all times in contact with the inner end of the adjusting screw 104, while the rotation of the hand wheel 105 in either direction will adjust the guides in any desired position.

The bracket ends 83 of the rest bar 84 are secured by means of bolts 106 to the roll housing 86 the heads of which are inserted in the T-slots 85, the ends extending outwardly therefrom through elongated slots 107 in the bracket ends 83. The ends of the bolts have nuts threaded thereon as at 108 for securely clamping the rest bar 84 in position.

In Figs. 12 to 15 inclusive I have shown another slightly modified form of construction to those shown in Figs. 1 to 11. In this construction the twisting rollers 109 and collars 110 are mounted in a similar manner to those shown in Figs. 9 to 11 the ends of the shafts 111 being mounted in split bearing blocks 112 which are pivoted in the bifurcated ends of the walking beams 113 and 114 and held against rotation by means of the bolts 115.

The walking beam 113 is formed with a projecting flange 116 having a threaded opening for receiving an adjusting bolt 117. This adjusting bolt is adapted to contact with the ears 118 and 119 formed integral with one of the bracket ends 120 of the rest bar 121. By vertically adjusting the bolt 117 the twisting rollers 109 and collars 110 forming the sides of the guides can be longitudinally adjusted to give the desired twist to the bar being rolled.

My twisting guides may be mounted on the roll housings of all the roll stands of a continuous rolling mill if desired but in some cases this is not necessary as illustrated in Fig. 1 of the drawings in this figure a square or rectangular bar 6 without being twisted or rotated, enters the roll pass 5 thereby reducing it to a substantially diamond shaped bar 8 in cross section, this bar has to be rotated 90° as indicated to enter the next pass which reduces it again to a square or rectangular bar in cross-section, this bar section will enter the next roll pass which may be similar to roll pass 5 but of smaller area without being rotated, but after passing through that roll pass the bar will have to be again rotated as indicated for bar 8 in order to give the proper working of the metal in reducing the bar.

I also wish it understood that my twisting mechanism would operate equally as well if applied to the entering side of the roll housing, or at an intermediate point between the stands of rolls if desired.

Although I have described and illustrated my invention in considerable detail, I do not wish to be limited to the exact and specific details thereof as shown and described, but may use such modifications in, substitutions for, or equivalents thereof, as are embraced within the scope of my invention, as pointed out in the claims.

Having thus described my invention what I claim as new and desire to secure by Letters Patent is:

1. A rolling mill guide comprising a pair of walking beams, a pair of shafts carried by the walking beams, a roller mounted on each shaft, a collar mounted on each roller, the collar mounted on one roller coacting with the collar mounted on the other roller, and means for longitudinally adjusting the rollers.

2. A rolling mill guide comprising a pair of walking beams, a pair of shafts carried by the walking beams, a roller mounted on each shaft, collars mounted on each roller, each collar mounted on one roller coacting with a collar mounted on the other roller to form a twisting guide therebetween, and means for simultaneously adjusting both of the rollers longitudinally.

3. A rolling mill guide comprising a pair of walking beams, a bearing secured to each end of the walking beams, a pair of shafts having their ends supported by the bearings, a roller mounted on each shaft, removable collars mounted on each roller, each collar mounted on one roller coacting with the collar mounted on the other roller to form a twisting guide therebetween for a bar being rolled, and means for simultaneously adjusting both of the rollers longitudinally in opposite directions.

4. A rolling mill guide comprising a roll housing, a pair of walking beams pivotally attached to the roll housing, a bearing secured to each end of the walking beams, a pair of shafts having their ends supported by the bearings, anti-friction bearings mounted on the shafts, a roller mounted on the anti-friction bearings on each shaft, collars mounted on each roller, each collar mounted on one roller coacting with the collar mounted on the other roller to form a guide therebetween for a bar being rolled, and means for simultaneously adjusting both of the rollers longitudinally in opposite directions.

5. A rolling mill guide comprising a roll housing, a rest bar having bracket ends secured to the roll housing, a walking beam pivotally mounted on the bracket ends of the rest bar, bifurcated ends formed in the walking beams, a bearing pivoted between each of the bifurcated ends of the walking beams, a pair of shafts having their ends screw threaded and supported by the bearings, nuts on each end of the shafts for clamping the bearings to the shafts, a roller mounted on each shaft, collars mounted on each roller, each collar mounted on one roller coacting with the collar mounted on the other roller to form a guide therebetween for a bar being rolled, and means for simultaneously adjusting both of the rollers longitudinally in opposite directions.

6. A rolling mill guide, comprising a pair of walking beams, a pair of spaced rollers, shafts for the rollers having their ends screw threaded and supported by the walking beams, collars mounted on the rollers, an adjusting nut threaded on the end of one of the shafts, and a wrench for engaging the nut and adapted to simultaneously adjust the rollers longitudinally in opposite directions.

7. A rolling mill guide, comprising a pair of walking beams having bifurcated ends, a bearing block pivotally secured in each of the bifurcated ends of the walking beams, a pair of shafts having screw threaded extensions supported by the bearing blocks, a nut on each of the screw threaded extensions adapted to engage one side of the bearing blocks and retain the shaft in an adjusted position, a roller mounted on each shaft, collars mounted on each roller, each collar on one roller coacting with the collar mounted on the other roller to form a guide therebetween, an adjusting nut having a fluted surface mounted on the end portion of one of the shafts, and a wrench mounted thereon having a tooth for engaging the fluted surface of the nut for adjusting the rollers.

8. A rolling mill guide, comprising a pair of rollers spaced apart and rotatably mounted, coacting collars having inclined side faces arranged in pairs mounted on the rollers, said inclined side faces of the pairs of coacting collars forming twisting guides adapted to twist a rolled bar, and means for longitudinally adjusting the coacting collars simultaneously whereby the angle of twist may be varied while the bar being twisted is in transit through the guide.

9. The combination with a pair of rolls having a pass formed therein, a pair of rollers spaced apart and rotatably mounted, interchangeable collars having inclined coacting side faces mounted on the rollers adapted to form twisting guides for rolled bars of varying sizes and shapes, fastening means for the collars, and means for simultaneously adjusting each roller longitudinally in opposite directions.

10. The combination with a pair of rolls having a pass formed therein, a primary twister adapted to receive a rolled bar from the roll pass and give the bar an initial twist, a secondary twister comprising a pair of rollers, coacting collars having inclined side faces arranged in pairs mounted on the rollers and forming guides adapted to complete the desired twist angularity of the bar and in which the primary set ceases to function as twisters after the bar engages the inclined faces of the collars forming the guides of the secondary twisters, and means for simultaneously longitudinally adjusting the coacting collars.

11. In a rolling mill, the combination of a roll housing, a rest bar secured to the roll housing, a roller twisting unit provided with a plurality of guides secured to the rest bar and the roll housing, means simultaneously operated for adjusting the width of the plurality of guides without changing the centers of the guide passageways and means for detaching the twisting unit from the rest bar and roll housing independent of the rest bar.

12. In a rolling mill, the combination of a roll housing, a pair of rolls having a plurality of passes formed therein mounted in the roll housing, a rest bar having bracket ends secured to roll housing, stationary guides mounted on the rest bar, a twisting passageway in the stationary guides opposite each roll pass, an extending boss formed integral with each bracket end of the rest bar, a walking beam having bifurcated ends pivotally mounted on each boss, a bearing block pivotally mounted in each bifurcated end of the walking beams, a pair of shafts having their ends supported by the bearing blocks, a pair of anti-friction bearings mounted on each shaft, a fixed shoulder for engaging one of the anti-friction bearings, a movable ring for engaging the other anti-friction bearing, a nut threaded on each shaft for engaging the movable ring, a set screw for engaging each nut, a roller mounted on the anti-friction bearings on each shaft, collars mounted on each roller, each collar mounted on one roller coacting with a collar mounted on the other roller adapted to form a pass therebetween in alignment with the twisting passageways in the stationary guides, and means for simultaneously adjusting the rollers in opposite directions.

13. A rolling mill guide, comprising a pair of shafts, a roller rotatably mounted on each shaft, coacting collars mounted on each roller, twisting guides formed by the coacting collars, walking beams for supporting the ends of the shafts, a nut on each shaft for holding the rollers in position on the shafts, a set screw for each nut for retaining the nut in its adjusted position, and means for simultaneously adjusting the rollers in opposite directions to each other.

14. A rolling mill guide, comprising a pair of rollers spaced apart and rotatably mounted, means for normally holding the rollers stationary in fixed relation to each other, a plurality of spaced collars having opposed inclined side faces detachably mounted on the rollers, each collar mounted on one roller coacting with a collar mounted on the other roller and adapted to form a twisting guide between each pair of opposed inclined side faces of the collars, and means for simultaneously adjusting the width of each pair of guides without changing the center of the guide.

15. In a rolling mill guide for twisting rolled bars, comprising a pair of normally fixed shafts, a roller rotatably mounted on each shaft, detachable collars mounted on each roller, each collar mounted on one roller having an inclined side face coacting with an opposed inclined side face of a collar mounted on the other roller and adapted to form a twisting guide for engaging the opposite corner side edges of a rolled bar, and means for simultaneously adjusting the shafts and rollers mounted thereon in the reverse direction to each other.

16. In a rolling mill guide, comprising a rest bar, bracket ends formed on the rest bar, a walking beam pivotally secured to each of the bracket ends of the rest bar, a bearing block pivotally attached to each end of the walking beams, a pair of shafts having their ends supported in the bearing blocks, a roller rotatably mounted on each shaft, detachable collars mounted on the rollers, means for engaging the end of one of the shafts adapted to project the rollers longitudinally in one direction, and adjusting means engaging the opposite end of the shaft for longitudinally adjusting the rollers in the opposite direction.

17. In a rolling mill guide, comprising a rest bar, bracket ends formed on the rest bar, a walking beam pivoted centrally to each of the bracket ends of the rest bar, a bearing block pivotally attached to each end of the walking beams, a pair of shafts spaced apart having their ends supported in the bearing blocks and keyed thereto, a roller rotatably mounted on each shaft, detachable collars mounted on the rollers, an adjusting screw engaging the end of one of the shafts for longitudinally adjusting the rollers, and a spring pressed plunger engaging the opposite end of said shaft.

18. A rolling mill guide, comprising a rest bar, bracket ends formed on the rest bar, a pair of spaced ears extending from one of the bracket ends of the rest bar, a walking beam pivoted centrally to each of the bracket ends of the rest bar, a bearing block pivotally attached to each end of the walking beams, a pair of shafts spaced apart having their ends supported in the bearing blocks, a roller rotatably mounted on each shaft, detachable collars mounted on the rollers, a flanged projection extending from one of the walking beams, a threaded opening formed in the flanged projection, and an adjusting bolt in the threaded opening adapted to contact with the spaced ears for longitudinally adjusting the rollers.

19. A rolling mill guide, comprising a pair of rollers spaced apart and rotatably mounted, means for normally holding the rollers in fixed relation to each other, spaced collars on the rollers adapted to form guides to twist a bar being rolled as it passes between the said rollers, and simultaneously operated means for longitudinally adjusting the rollers the same relative movement in opposite directions.

20. A rolling mill guide, comprising a pair of rollers spaced apart and rotatably mounted, means for normally holding the rollers against longitudinal movement and in fixed relation to each other, a collar on each roller, the collar on one roller having an opposed inclined surface coacting with the inclined surface of the collar on the other roller and adapted to form a twisting guide therebetween, and means simultaneously operated for longitudinally adjusting the pair of rollers in relation to each other.

HARRY R. GEER.